United States Patent [19]

Mole

[11] 3,878,713
[45] Apr. 22, 1975

[54] WIND TUNNEL BALANCE FOR SUPPLYING COMPRESSED FLUID TO THE MODEL

[75] Inventor: Philip J. Mole, San Diego, Calif.

[73] Assignee: General Dynamics Corporation, San Diego, Calif.

[22] Filed: Nov. 16, 1973

[21] Appl. No.: 416,486

[52] U.S. Cl. .................................................. 73/147
[51] Int. Cl. ............................................. G01m 9/00
[58] Field of Search.......... 73/147, 88.5, 141, 133 R.

[56] References Cited
UNITED STATES PATENTS

| | | | |
|---|---|---|---|
| 2,918,816 | 12/1959 | Ormond | 73/147 |
| 3,100,990 | 8/1963 | Dimeff | 73/147 |

Primary Examiner—Donald O. Woodiel
Attorney, Agent, or Firm—John R. Duncan; Hugo F. Mohrlock

[57] ABSTRACT

A strain gage balance capable of measuring the six force and moment components acting on a wind tunnel model while simultaneously supplying compressed fluid to the model. The balance is a cylindrical shell having low deflection characteristics and large inside diameter relative to outside diameter, allowing the location of one or more fluid passages within the inside diameter. The fluid is transferred from the tunnel portion of the balance to the model portion of the balance by low spring rate bellows which cause a minimum effect on the measuring capabilities of the balance.

10 Claims, 19 Drawing Figures

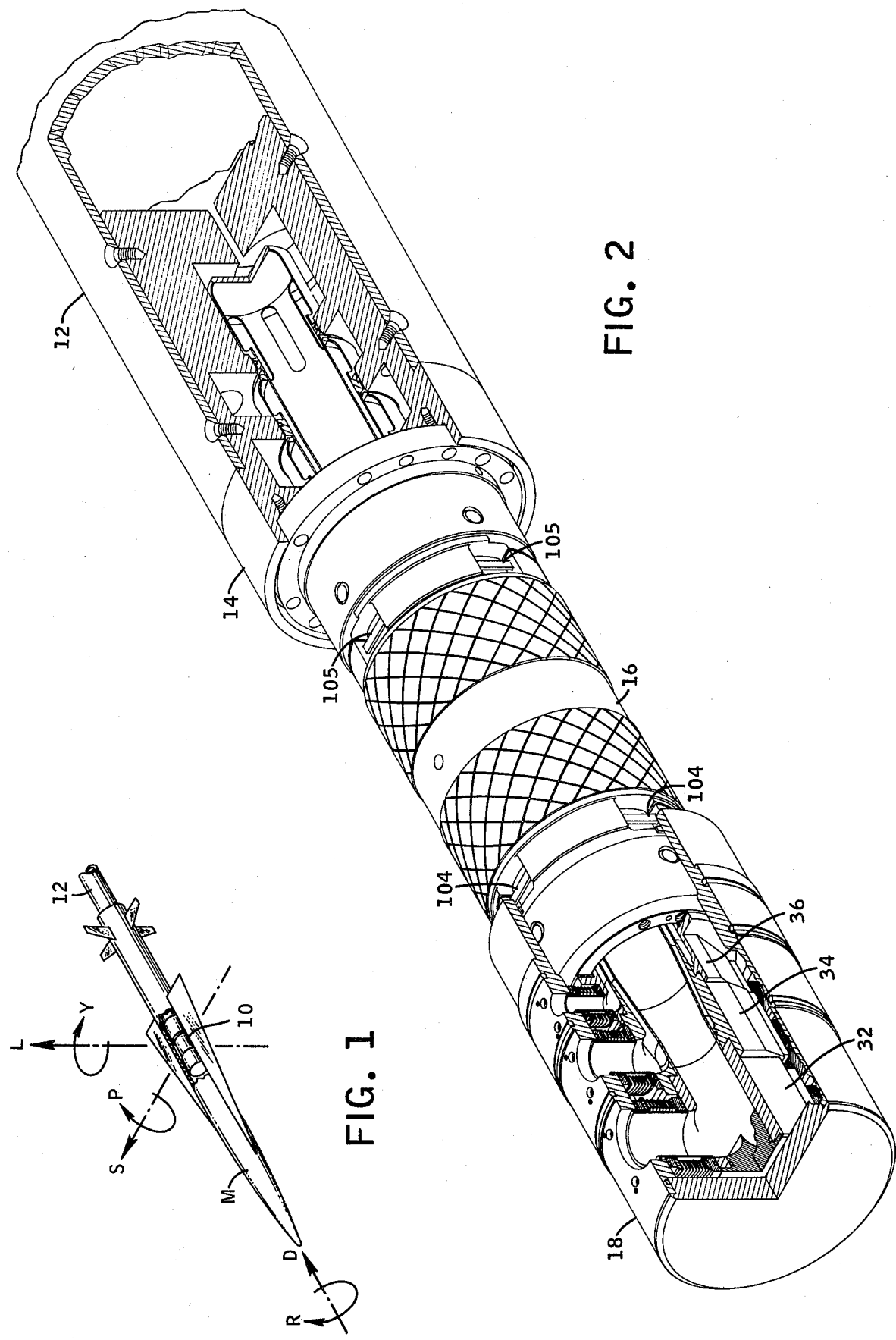

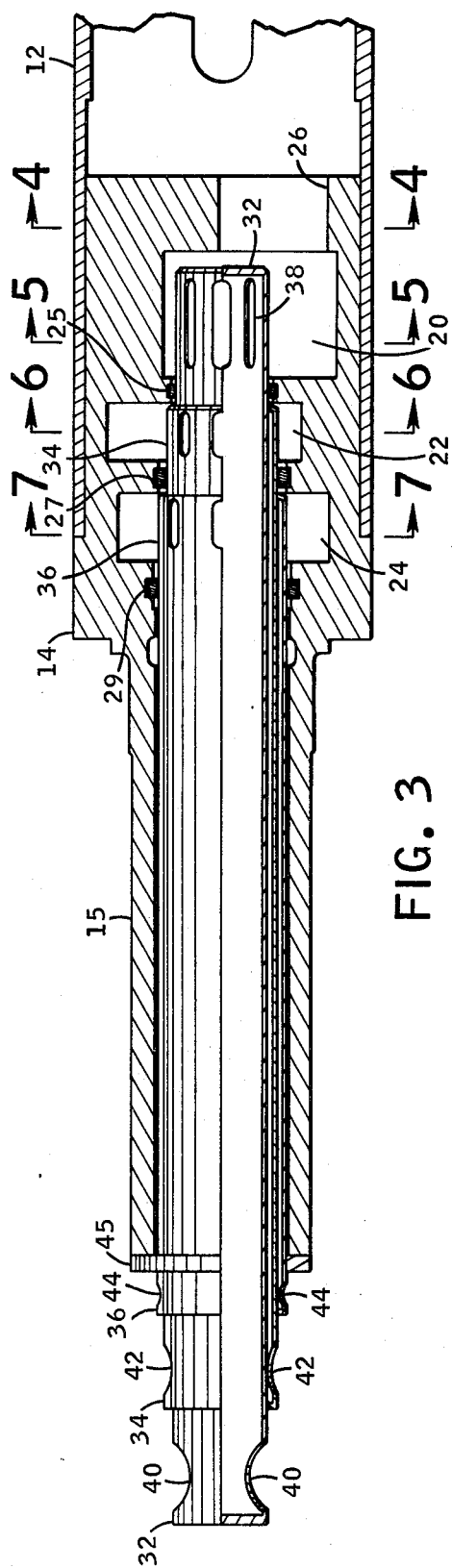
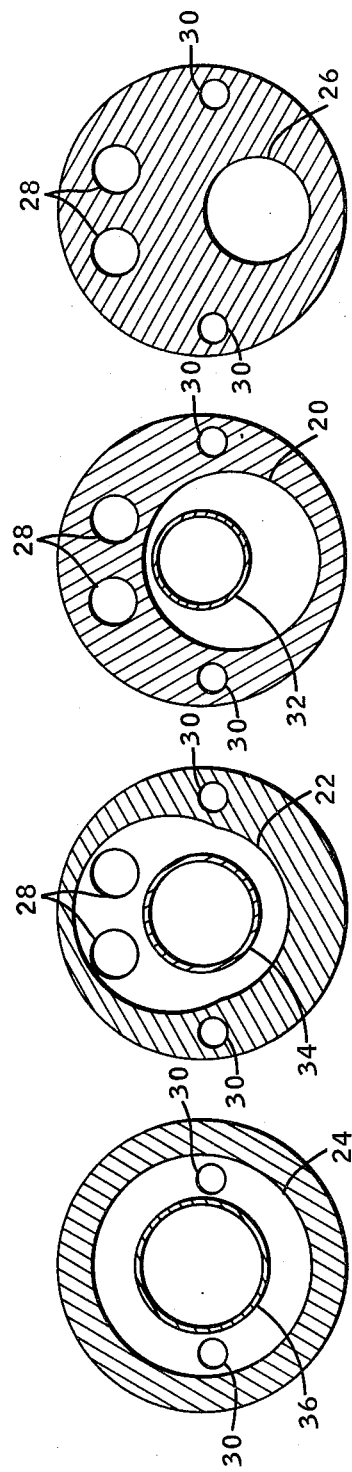
FIG. 3
FIG. 4
FIG. 5
FIG. 6
FIG. 7

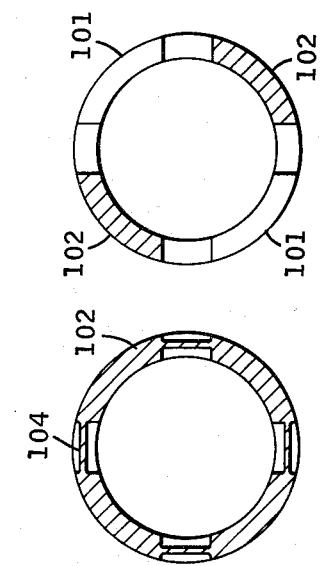
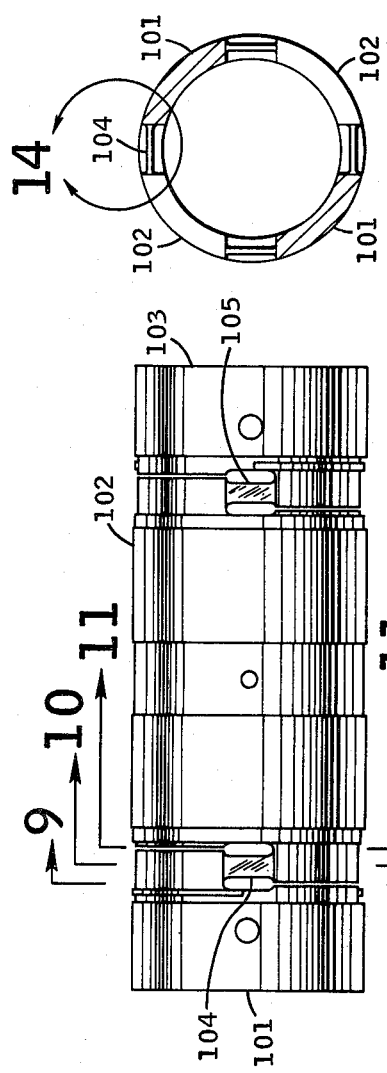
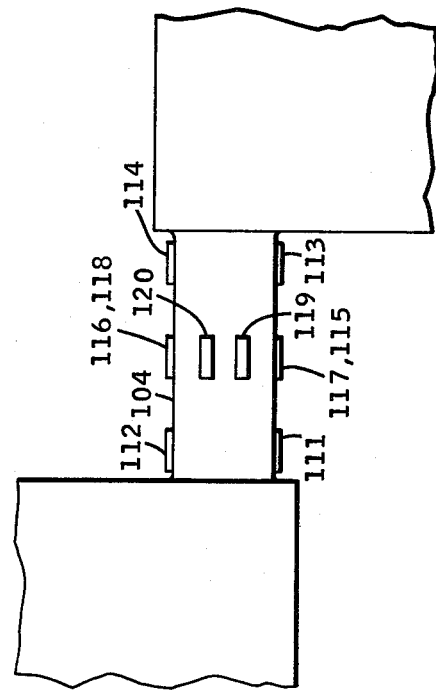
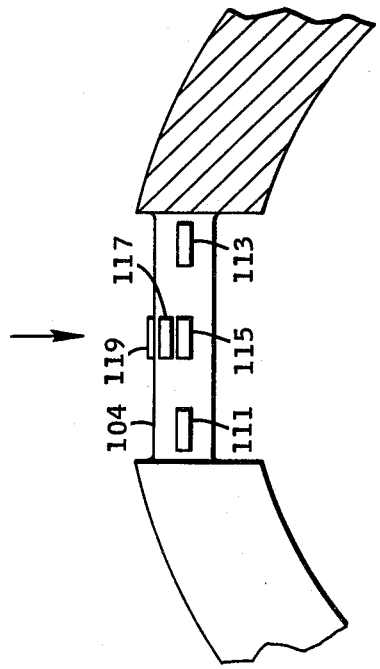

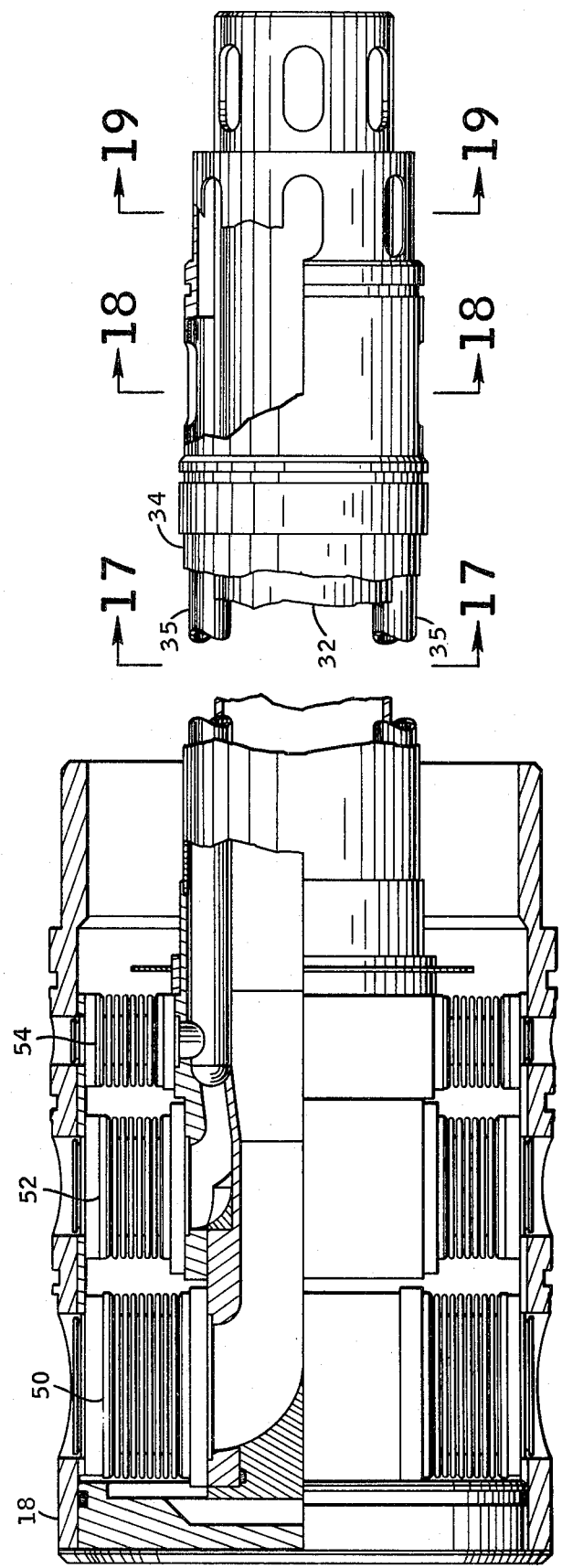
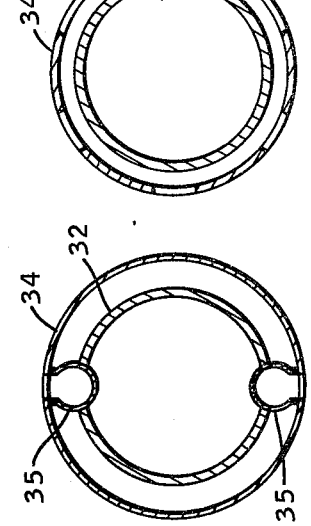
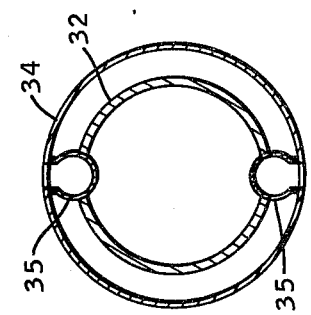
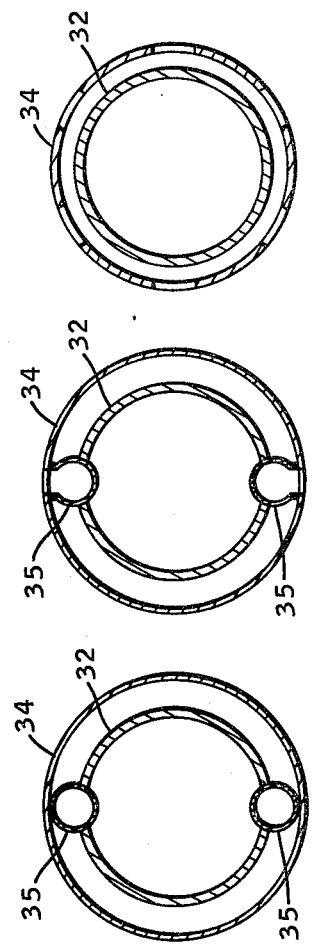
FIG. 16
FIG. 17  FIG. 18  FIG. 19

WIND TUNNEL BALANCE FOR SUPPLYING COMPRESSED FLUID TO THE MODEL

BACKGROUND OF THE INVENTION

This invention relates generally to force measuring instruments, and more particularly to the measuring of forces on wind tunnel models. The invention has particular application to supplying compressed fluid to the model while supporting the model in a wind tunnel and measuring the forces acting thereon.

There are six components of the force and moment action on the model which are of interest to the designer in evaluating the flying qualities of an aircraft. These six components are well known by those skilled in the art as lift force, drag force, side force, pitching moment, yawing moment, and rolling moment. By determining the magnitude of these components acting on a scale model in a wind tunnel, certain design parameters can be obtained which will apply to the full-scale aircraft.

Prior types of strain gage balances have been successfully utilized to measure the forces in wind tunnel models. The moments and forces acting on the model were usually resolved into the three components of force and three components of moment by providing different members within the balance that were sensitive to only one or two components. Each of the members carried strain gages which were connected in combinations that formed Wheatstone bridge circuits. By appropriately connecting the strain gages, the resulting Wheatstone bridge circuit unbalances could be resolved into readings of the three components of force and three components of moment.

With the advent of jet aircraft employing engines having high mass flows, it became increasingly necessary to simulate the jet exhaust when tunnel testing a model. Also, for the investigation of boundary layer control, it became necessary to direct air to the model to simulate various augmentation designs for controlling boundary layer. In the design of very slow speed takeoff and landing aircraft for use on short runways, it was necessary to duct air to the model to simulate devices for "blowing" lifting surfaces to increase lift at these very slow speeds.

All access to the model is by way of the sting support, having the balance attached to the upstream end. The balance is small enough to fit through the aft end of the model into a cavity within the model. Thus it can be seen that all tubes, hoses, wires and such must compete with the balance for the small cross section of area available within the slim cavity of the model. In addition to the problem of space there is also the problem of how to isolate the strains on the model due to the restraining effect of air hoses from the strains due to aerodynamic loading.

When existing balances were made small enough in cross section to share the small available space with air hoses, they sometimes lacked the necessary structural capacity to carry the loads. Further, there were problems associated with the natural frequency characteristics, within the range of frequency components caused by aerodynamic vibrations, which adversely affected the accuracy of the strain gage bridge circuit readings obtained. Thus it can be seen that a need existed for an improved design of a measuring device that would permit space for ducting fluids to the model without degrading the ability to accurately measure the model loads.

SUMMARY OF THE INVENTION

The primary object of this invention is to provide a strain measuring device for determining the lift, drag and side forces on a model and the moments of pitch, yaw, and roll while simultaneously providing compressed fluid to the model.

Another important object is to provide an instrument capable of measuring the three linear forces and the three rotational forces or moments with greatly reduced deflection per unit of load as compared to conventional instruments of corresponding size. Such an approach will permit the connection of tubing across the force measuring system, wherein sufficient flexibility may be provided in the tubing to prevent any effect on the measuring capabilities of the balance.

The above and other objects of this invention are attained by utilizing stiffness in place of flexibility in the load cells of the instrument. This approach is somewhat unconventional inasmuch as many successful balances have utilized flexibility to isolate interactions between the various load cells. By the use of a stiff balance, movement of the load cells is decreased which automatically reduces interaction. Additionally, the dynamics of the model is improved, since a stiffer balance prevents dynamic vibration over a greater range than a flexible balance would provide. Another advantage to the stiff balance, because of the reduced excursions or deflections of the model, is that the clearances between the test model and the sting may be reduced to provide an aerodynamically cleaner arrangement.

To meet the foregoing design approach, the preferred embodiment of the present invention takes the form of a symmetrical structure employing rigid load cells in which many of the interactions are cancelled out. The instrument comprises generally an outer sleeve within which is disposed a cylinder. The outside diameter of the cylinder is less than the inside diameter of the sleeve so that a small annular clearance between the two exists. The inner cylinder is held in a stationary position by means of a sting while the outer sleeve is secured to the model. The outer sleeve is thus subject to lift, drag, and side forces as well as pitch, yaw, and roll moments. By interconnecting the inner cylinder with the outer sleeve by means of load cells, these various forces applied to the sleeve can be measured.

The bore of the inner cylinder provides the space for routing tubes therein for conducting compressed fluids through the balance. The tubes run from the sting through the balance and thereafter connect to the model by means of low spring rate bellows located diametrically opposite one another in order to self-cancel their respective pressure areas. The use of directly opposing, low spring rate bellows allows the transfer of fluid across the sting to the model with a minimum effect on the measuring capabilities of the balance.

BRIEF DESCRIPTION OF THE DRAWINGS

The advantages of the present invention reside in the construction and cooperation of elements hereinafter described, reference being made to the accompanying drawings forming a part of this disclosure, wherein one embodiment of the invention is shown by way of example. It should be understood, however, that the drawings and description are for the purposes of illustration only and are not to be construed as defining or limiting the scope of the invention.

In the drawings, wherein like numbers designate like parts throughout the views:

FIG. 1 shows the balance supporting a model within a wind tunnel.

FIG. 2 is a general overall view of the balance.

FIG. 3 is a cross section of the sting-mounted, non-metric, portion of the balance.

FIGS. 4 through 7 are section views taken along the lines 4—4 through 7—7, respectively, of FIG. 3.

FIG. 8 illustrates the outer sleeve, which contains the load cell portion of the balance.

FIGS. 9 through 11 are section views taken along lines 9—9, 10—10, and 11—11, respectively, of FIG. 8.

FIGS. 14 and 15 are enlarged views of one of the instrumented load cell webs.

FIG. 16 is a partially sectioned view of an alternate arrangement of fluid tubes through the balance.

FIGS. 17 through 19 are sectional views taken along lines 17—17 through 19—19, respectively, of FIG. 16.

DESCRIPTION OF THE PREFERRED EMBODIMENT

Figure 12:
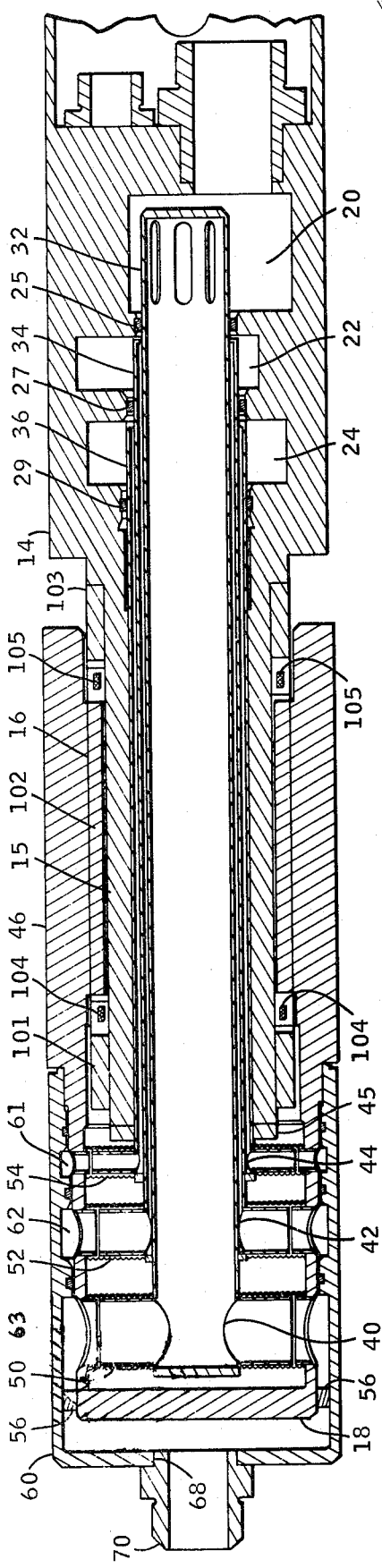
FIG. 12 is a view of a partially sectioned balance assembly.

Referring to FIG. 1, there is schematically illustrated a typical installation wherein a model, M, is positioned in a wind tunnel by means of the balance 10 and a sting 12 aligned in a generally horizontal position and projecting upstream in the wind tunnel. The model, M, engages a portion of balance 10 in such a manner that the three components of moment and the three components of force will be detected by the balance 10. These components are shown in FIG. 1 wherein the roll moment is indicated by the circular arrow R, the pitching moment by the circular arrow P, the yaw moment by the circular arrow Y, the drag force by arrow D, the side force by the arrow S, and the lift force by the arrow L.

The balance 10 is disposed near the center of gravity of the model and all forces detected by the balance are communicated by means of electrical wires which are routed through the sting 12 to a stationary base (not shown). In a like manner tubes for communicating fluids, such as air, to the model are routed through the hollow sting, 12.

FIG. 2 is an enlargement of a portion of the view shown in FIG. 1. A portion of the sting 12 may be seen partially sectioned to show the fluid source and sting mounting portion 14 of the balance. The two other major components of the balance are the model attachment portion or outer shell 16 and the fluid distribution portion 18, each of which will subsequently be described in detail.

Illustrated in FIG. 3 is a cross section of the sting mounted portion of the balance and the fluid distribution system. Disposed within sting adapter 14 are three chambers 20, 22, and 24, each having separate avenues of communication to the interior of the sting. As may best be seen in FIGS. 4 through 7, chamber 20 is connected with passage or bore 26, chamber 22 is connected with passages 28, and chamber 24 connects with passages 30. In FIG. 3 it will also be observed that disposed within the sting adapter 14 is a plurality of concentric tubes 32, 34, and 36. Tube 32 is concentrically located within tube 34 and attached thereto at both ends in a leak-tight joint such as by brazing, and in a like manner tube 34 is located within tube 36 and attached thereto at both ends in leak-tight attachments. The chambers 20, 22, and 24 are sealed from one another by suitable seals, such as O-ring seals. These seals 25, 27, and 29 are disposed on the outside diameter of each of the tubes 32, 34, and 36. Each of the tubes 32, 34, and 36 contain a plurality of oblong holes in the sting end of the tubes, as for example holes 38 in tube 32. Located on the opposite end of each tube is a pair of holes diametrically opposed to one another, holes 40 being so located in tube 32, holes 42 in tube 34, and holes 44 in tube 36.

Flange 45 is firmly attached to outside tube 36, such as by brazing, and attached to inner core or cylinder 15 by any appropriate means such as screws or by brazing, inner core 15 being attached to sting adapter 14 in a like manner, or core 15 and adapter 14 may be a single part. In some circumstances it may be desirable that flange 45 and cylinder 15 be joined together in such a manner that shims may be placed between them, permitting holes 40, 42, and 44 to be axially aligned precisely with other portions of the balance. It will be observed that this flange 45 is the only structural connection of the tubes 32, 34 and 36 to the inner cylinder 15, and thereby any length change of the tubes 32, 34 and 36 due temperature changes is accommodated without any significant strain imposed on the inner cylinder 15 and sting adapter. This is because the major length change in tubes 32, 34 and 36 will occur in that portion of the tubes situated downstream (to the right in FIG. 3) of flange 45, and this contraction or expansion of length is accommodated by seals 25, 27 and 29 with no significant strain imposed on inner cylinder 15 and sting adapter 14.

From FIGS. 3 to 7 it should be clear that any pressurized fluid introduced into bore 26, such as by a hose routed within the sting 12, would communicate with chamber 20 and then by means of oblong holes 38 into tube 32 and exit tube 32 at holes 40. In a like manner pressurized fluid entering bores 28 will pass to chamber 22, then to tube 34, exiting at holes 42, and fluid entering bores 30 will pass to chamber 24, then to tube 36, and will exit holes 44. It should also be clear that all structure shown in FIG. 3 is substantially a structurally integral part of the sting and is referred to as the nonmetric portion of the balance.

In FIG. 8 is shown a more detailed illustration of the outer sleeve 16 of the balance previously seen in FIG. 2, FIGS. 9, 10, and 11 being cross sections of outer sleeve 16 along lines 9—9, 10—10, and 11—11, respectively. It should be understood that the sleeve 16 is made from one piece of stock which has been machined to the configuration shown, however for convenience various portions of this part will be separately described and numbered. In viewing FIGS. 8 through 11 it will be observed that the only connection of portion 101 to portion 102 is by means of four webs 104, and in a like manner portion 102 is connected to portion 103 only by means of four webs 105. Since portions 101 and 103 are firmly attached to the sting portion, or non-metric side, of the balance and portion 102 is firmly attached to the model, or metric, side of the balance, it can be clearly understood that all loads imposed on the model must be transferred to the sting by means of the four forward webs 104 and the four aft webs 105. It can also be understood that with strain gaging of the eight webs 104 and 105 to form eight load cells, it is possible to record the forces acting on the model. The method of connecting together the strain gages to obtain the required six components will be described in more detail later herein. It is sufficient at this time to understand that outer sleeve 16 is the load cell portion of the balance, that it is the interface between the metric and non-metric portion of the balance, and that it is formed from a single piece of material such as ARMCO 17-4PH stainless steel, or any other suitable material which will exhibit a high degree of uniformity and absence of internal stresses to thereby provide uniform and predictable strength, strain, and fatigue endurance characteristics, and produce strains proportional to load with minimum error. It should be appreciated that the uniformity and lack of material stresses of such a part would far exceed that of a sleeve fabricated from separately formed parts 101, 102, and 103 attached together by brazing or welding webs 104 and 105 thereto with all the associated internal stresses and inaccurate strain readings near fillet radii of the welded joints.

In FIG. 12 can be seen the completely assembled balance. The outer sleeve 16 is so shaped that a small annular clearance between the outer sleeve 16 and inner cylinder 15 exists in the area of portion 102 of outer sleeve 16. In the area of portions 101 and 103 of the outer sleeve 16 there may be either a snug fit or press fit with inner cylincer 15, and portions 101 and 103 secured therewith by pins, brazing, or other means. Attached securely to outer sleeve 16 only at portion 102 is the model attachment fitting 46, which is configured to attach internally to the scale model and support the model during the tunnel tests. Secured to the forward end of attachment fitting 46 is fluid distribution cap 18 having holes positioned in alignment with and of the same general size as holes 40, 42, and 44 of tubes 32, 34 and 36. Interconnecting these matching holes in distribution cap 18 and tubes 32, 34 and 36 are bellows 50, 52, and 54, respectively. These metal bellows may be made by various techniques which are divided into five categories: rolled, hydroformed, chemically deposited, electro-deposited, and welded. Bellows materials include brass, nickel, stainless steel, monel and inconel. The bellows are configured to have as low a spring rate as is compatible with the fluid pressures carried within. Each pair of bellows is disposed directly opposite each other to produce a self-cancelling pressure area characteristic.

Figure 13:
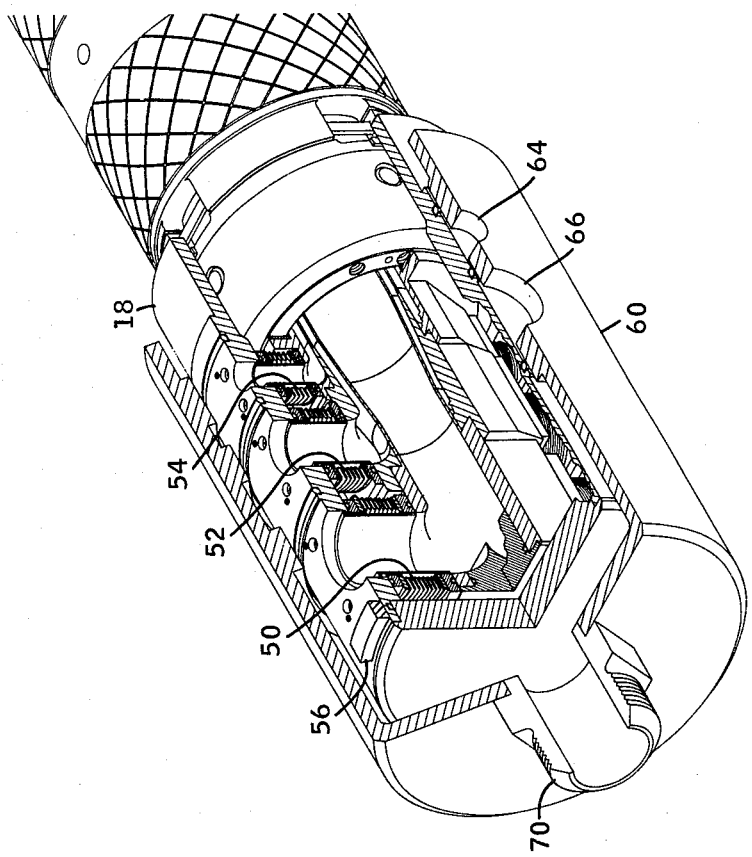
FIG. 13 is an enlarged view of the bellows end of the balance and the addition of a minifold cap over the distribution cap.

Surrounding distribution cap 18 is manifold cap 60, which has been configured to form three annular chambers 61, 62, and 63 with distribution cap 18, each chamber being pressure isolated by seals, such as O-rings, disposed between distribution cap 18 and manifold cap 60. FIG. 13 shows one of two ports 64, diametrically opposed to each other in manifold cap 60 and communicating with chamber 61. These two ports 64 are located 90° from each of the two bellows 54 which also communicate with chamber 61. In a like manner the two ports 66 in manifold cap 60 communicate with chamber 62 and are likewise clocked 90° from bellows 52. The port 68 for chamber 63 is located in the end portion of manifold cap 60. All of the ports 64, 66, and 68 may be adapted for accepting any suitable fluid conduit in the model such as pipe, hose, or tubing, as for example the male flared tube union 70 which is shown disposed in port 68 and secured therein, such as by brazing. The function of manifold cap 60 is to attenuate any asymmetrical loading of the balance caused by unequal fluid flow through any of the bellows. For example, if the fluid flowing from one of the bellows 52 to the right hand side of the model was flowing at a higher rate than fluid flowing from the second bellows 52 to the left hand side of model, there may be a resultant pressure differential in the system which could induce a slight strain reading the balance. By locating ports 64 and 66, as described and illustrated in FIGS. 12 and 13, the flow from each set of bellows will be more equalized, the flow from any one bellows tending to split equally without momentum effects and supply approximately half of the flow to each of the two ports. in FIGS. 12 and 13 can be seen barrier blocks 56, one located near each of the two outlets of bellows 50. These two barrier blocks 56, which extend only around a portion of the outside diameter of cap 18, serve to divert the fluid flow from the bellows 50 so that it tends to split equally without momentum effect as the fluid flows to port 68. Clearly, where flow anomalies do not exist the manifold cap 60 is not required, and fluid conduits from the model may be connected directly to the distribution cap 18 at each of the bellows exhaust ports. Where a single port is required, then the arrangement of chamber 63 and port 68 of the manifold cap 60 may be of advantage, it being understood however that there may also be two exhaust ports 68 located side-by-side in manifold cap 60, or chamber 63 may be shaped like chamber 62 and 61, and ports 68 located in the same manner as ports 64 and 66.

FIG. 14 is an enlarged view of a portion of FIG. 9, showing one of the webs 104 and the strain gages 111 thru 120 attached thereto, and FIG. 15 is a top view of FIG. 14. The strain gage placement illustrated is repeated on each of the four webs 104 and the four webs 105. Eight precision foil strain gages are affixed to each of the webs 104 and 105 for a total of 64 gages. Gages are located at each end of the web, one per side, 111, 112, 113, and 114. Two gages, 115 and 116, are located at the center of the web, one on each side. Another two gages are desired at the top of the web, and may be located on the sides at 117 and 118 locations or on the top surface location where gages 119 and 120 are shown, this top surface location being preferred and used any time the beam is sufficiently wide to accommodate two gages located side-by-side, as are 119 and 120. It should be noted that the thickness, width, and length of webs 104 and 105 are a function of the loads to be measured and the degree of stiffness desired.

These gages, 111 thru 120, are electrically interconnected in Wheatstone bridge circuits in various combinations to measure the sums and the differences of loads and moments in order to obtain the desired six force and moment readings. Gages 115 and 116 of the upper web 104 are interconnected with gages 115 and 116 of the diametrically opposite lower web 104 to form a bridge identified as $Y_1$. Gages 115 and 116 of the left side web 104 are interconnected with gages 115 and 116 of the diametrically opposite right side web 104 to form a bridge identified as $N_1$. In a like manner the gages 115 and 116 on the aft webs 105 are interconnected to form bridges $Y_2$ and $N_2$.

Before any additional connections of gages are made, a series of calibration loadings are recorded for each of the unconnected gages 11, 112, 113, 114, 119 (or 117) and 120 (118), to determine which gages indicate the least interaction and greatest accuracy. From gages 111, 112, 113 and 114 on the four forward webs 104 (total of 16 gages), four are selected and interconnected to form a bridge identified as $AXIAL_1$. In a like manner, four gages selected from any of the sixteen gages 111 thru 114, on aft webs 105 are interconnected to form bridge $AXIAL_2$. From the eight gages 119 and 120 on the four forward webs 104, four are selected to form bridge $ROLL_1$, and from the eight corresponding gages on the four aft webs 105, four are interconnected to form bridge $ROLL_2$.

Eight bridges have been identified, four from webs 104, $Y_1$, $N_1$, $ROLL_1$, and $AXIAL_1$, and four from webs 105, $Y_2$, $N_2$, $ROLL_2$, and $AXIAL_2$. Bridges $ROLL_1$ and $ROLL_2$ are wired in parallel, resulting in a single output identified as $ROLL_{total}$. Bridges $AXIAL_1$ and $AXIAL_2$ are also wired in parallel to give a single output $AXIAL_{total}$. Thus, it can be seen that there are six outputs from the combination of gages, which are $Y_1$, $Y_2$, $N_1$, $N_2$, $ROLL_{total}$ and $AXIAL_{total}$, and by use of calibration techniques and appropriate equations, which are well-known to those skilled in the art, the outputs may be used to determine lift force, drag force, side force, pitching moment, yawing moment, and rolling moment.

The bridges $ROLL_1$, $ROLL_2$ and $AXIAL_1$, $AXIAL_2$ are wired in parallel to compensate for dimensional changes in the balance caused by thermal and pressure effects. Referring to FIG. 12, it can be seen that any dimensional change of inner cylinder 15 relative to outer sleeve 16 causes webs 104 and 105 to deflect in opposite directions. Inner cylinder 15 will increase in length due to increased pressure applied within tubes 32, 34 and 36, causing a tension load to be applied to inner cylinder 15 by means of flange 45. However axial loads on the model, which are transferred to the balance by means of model attachment fitting 46 and outer sleeve 16, will cause webs 104 and 105 to deflect in the same direction. Thus, by wiring the AXIAL bridges and ROLL bridges in parallel they mathematically add and average the outputs from each independent bridge, resulting in an arrangement where opposite deflections, such as caused by temperature and pressure changes, are nulled-out leaving the AXIAL and ROLL loads as the only output of the circuits.

It will be recalled that in selecting the four strain gages for each of the AXIAL bridges there were sixteen gages available (four each of 111, 112, 113 and 114). The four most accurate gages were selected for the bridge. In a like manner the next four most accurate gages could be selected to form another AXIAL bridge, and this bridge could serve as a spare, should the primary bridge fail at any time during a test. In this same manner, standby or spare ROLL bridges may be provided.

While only 32 gages (for eight bridges) are all that are required to obtain the desired measurements, experience has shown the desirability of installing the 64 gages described herein to obtain greatly improved accuracy. Calibration runs have sometimes determined that the four most accurate gages for an AXIAL bridge may all be on one web. At other times, only one gage from each of the four webs is selected, and any other combination in between these two examples may prove the most accurate on another balance.

Calibration runs have shown that balances built as described herein have shown a maximum one sigma error for any loading of 0.16 percent of full load, with more than 90 percent of all loadings having an error of less than 0.10 percent of full load.

One of the primary objectives of the herein described invention was to provide a load measuring instrument wherein applied loads cause low deflections (in webs 104, 105, outer sleeve 16 and inner cylinder 15) while providing flexibility in the fluid tubing connections (bellows 50, 52 and 54). This is accomplished by minimizing the deflections of bellows 50, 52, and 54 and configuring the bellows to have spring rates that are small, linear, and repeatable. Experiments have indicated that the preferred bellows comprise stainless steel contours, called diaphragms, joined at the inside diameter to form convolutions, and a plurality of these convolutions welded at the outside diameter to form the bellows. Such bellows yield these favorable characteristics: constant effective area with change in pressure, good spring and pressure deflections, withstand high pressure and temperature, and have excellent corrosion resistance.

It is clear from examining FIG. 12 that the total applied load on model attach fitting 46, minus the force required to deflect bellows 50, 52 and 54, is the load measured by the load cells of outer sleeve 16. By providing bellows which have low spring rates, and other characteristics previously described, and webs 104 and 105 having high spring rates, the load measured by the balance is an accurate measurement of the applied load. Deflections of the bellows due to thermal and pressure changes in tubes 32, 34 and 36 is minimized by attaching these tubes by means of flange 45 to the non-metric side, inner cylinder 15, as far forward as possible. Since the free forward or upstream length of tubes 32, 34 and 36 is short, any change of length due to pressure or thermal changes will be minimized, and will cause very small deflections in bellows 50, 52, and 54.

It is also very important that during assembly of the balance that all bellows be accurately aligned, since misalignment will result in bellows induced pre-loads on the balance as well as vector forces from fluid pressure flow. In some instances it has been found advantageous to provide adjustment in the axial direction of cylinder 15 at flange 45 by the use of threaded attachments, shim stock, or other means to more precisely align bellows 50, 52, and 54.

The number of fluid passages may be varied as required for a specific test, and all tubes through the balance need not be concentric, as for example the embodiment illustrated in FIGS. 16, 17, 18, and 19, wherein the tubes 32 and 34 are essentially the same as in the preferred embodiment, but the outer tube 36 has been replaced by two smaller tubes 35. This tube assembly would fit into the same sting adapter 14 as the previous tube assembly, and the two tubes 35 would be fed by chamber 24 in the same manner as the tube 36 in the preferred embodiment.

While the balance has been shown and described as being cylindrical, it is understood that the invention is not limited to any particular cross section or dimensions. For example, the cross section may be square, hexagonal, or octagonal, and for utilization where more stiffness is required in one plane than another the cross section may be elliptical, rectangular, or any other shape having a major axis.

From the foregoing description of the construction and arrangement of the balance it will be apparent to one skilled in the art that the objects of the invention have been accomplished and that the herein described balance has the capability of simultaneously measuring the six force and moment components acting on a model while at the same time accommodating the transfer of a plurality of fluid flows across the balance with a minimum effect on the measuring capabilities. Moreover, other modification, arrangements, and applications of the invention will become apparent to those skilled in the art upon reading this disclosure, and these are intended to be included within the scope of this invention, it being understood that the preceding description is by way of example only and is not to be taken as a limitation, the spirit and scope of this invention being limited only by the claims.

I claim:

1. An improved strain gage balance of the type adapted to be received in a cavity within the body of a test model disposed in a flow field of a test tunnel for measuring component forces and moments applied thereto, said balance adapted for mounting at one end to said tunnel by means of a sting and at the other end to said model, wherein the improvement comprises:
   an outer sleeve subject to said forces and moments;
   a hollow core coaxially positioned in said sleeve, said core having an outside dimension less than the inside dimension of a portion of said sleeve, thereby forming a gap between said core and sleeve to permit displacement of said sleeve relative to said core;
   a plurality of webs positioned near each of the two ends of said sleeve to transmit said loads and moments from said sleeve to said core;
   at least one fluid conduit disposed within said hollow core and extending beyond the ends of said core; and
   a plurality of bellows located near a first end of said conduit between said conduit and said test model to conduct fluid from said conduit to said model.

2. The strain gage balance of claim 1 wherein a plurality of strain gages is attached to each of said webs to record loads carried therein.

3. The strain gage balance of claim 2 wherein at least two strain gages are located near the center of each of said webs, one gage on each of two opposite sides, and at least four strain gages are attached to each of said webs such that two are on opposite sides near a first end of each said web and two are on opposite sides near a second end of each said web.

4. The strain gage balance of claim 1 further comprising a manifold cap situated between said bellows and said test model to equalize the flow from said bellows to said model.

5. The strain gage balance of claim 1 wherein said bellows are located in pairs diametrically opposite one another on said fluid conduit, and further comprising a fitting for attaching said balance to said sting, said fitting adapted to receive the second end of said fluid conduit therein to conduct fluid routed within said sting to said fluid conduit.

6. An improved strain gage balance of the type adapted to be received in a cavity within the body of a test model disposed in a flow field of a test tunnel for measuring component forces and moments applied thereto, said balance adapted for mounting at a first end to said tunnel by means of a sting and at a second end to said model, wherein the improvement comprises:
   a hollow core adapted at said first end for mounting to said sting and extending coaxially from said sting, said core containing a plurality of chambers communicating to fluid pressure sources within said sting;
   a plurality of tubes disposed within said hollow core and adapted to communicate with said chambers to receive fluid pressure thereby, said tubes extending beyond the second end of said core;
   two bellows attached at a second end of each of said tubes diametrically opposite one another and extending radially therefrom;
   a distribution cap located coaxially with said hollow core and adapted to receive the free ends of said bellows to conduct fluid pressure from said bellows to said model;
   an outer sleeve, subject to said model forces and moments, positioned around at least a portion of said core, said sleeve having a central portion having inside dimensions greater than the outside dimensions of at least a portion of said core to form a clearance therebetween, said sleeve having first and second end portions rigidly attached to said core and said sleeve having a plurality of reduced cross sections forming webs between and interconnecting said central portion with said first and second end portions; and
   a plurality of strain gages attached to each of said webs for detecting loads carried therein.

7. The strain gage balance of claim 6 wherein said tubes are concentrically disposed within said core.

8. An instrument for measuring component forces and moments acting on a test model comprising a cylindrical outer sleeve, a cylindrical inner core, a first set of four load cells interconnecting said outer sleeve with said inner core, a second set of four load cells spaced axially from said first set and interconnecting said sleeve and said core, flexible means connected to said test model and routed through said inner core to communicate from outside said instrument to inside said model said flexible means comprising tubes and two bellows attached at one end to each of said tubes.

9. The instrument of claim 8 wherein each set of four load cells is peripherally spaced equally between said sleeve and said core.

10. An improved hollow strain gage balance adapted to be received in a cavity within the body of a test model disposed in a flow field of a test tunnel for measuring component forces and moments applied thereto, said balance being mounted at one end to said tunnel by means of a sting and at the other end to said model, and having a bore therethrough for routing communications from said sting to said model, comprising:
   a cylindrical sleeve subject to said forces and moments;
   a hollow cylindrical core coaxially positioned within said sleeve having tubes routed therethrough communicating between said sting and said model;
   a plurality of webs located at each of two ends of said sleeve for carrying said loads and moments imposed on said sleeve to said core; and
   a plurality of strain gages attached to one or more surfaces of each said web to detect loads carried therein.

* * * * *